April 6, 1965     G. A. ZOTOS     3,177,369
CRYOGENIC EXPANDER
Filed May 2, 1961
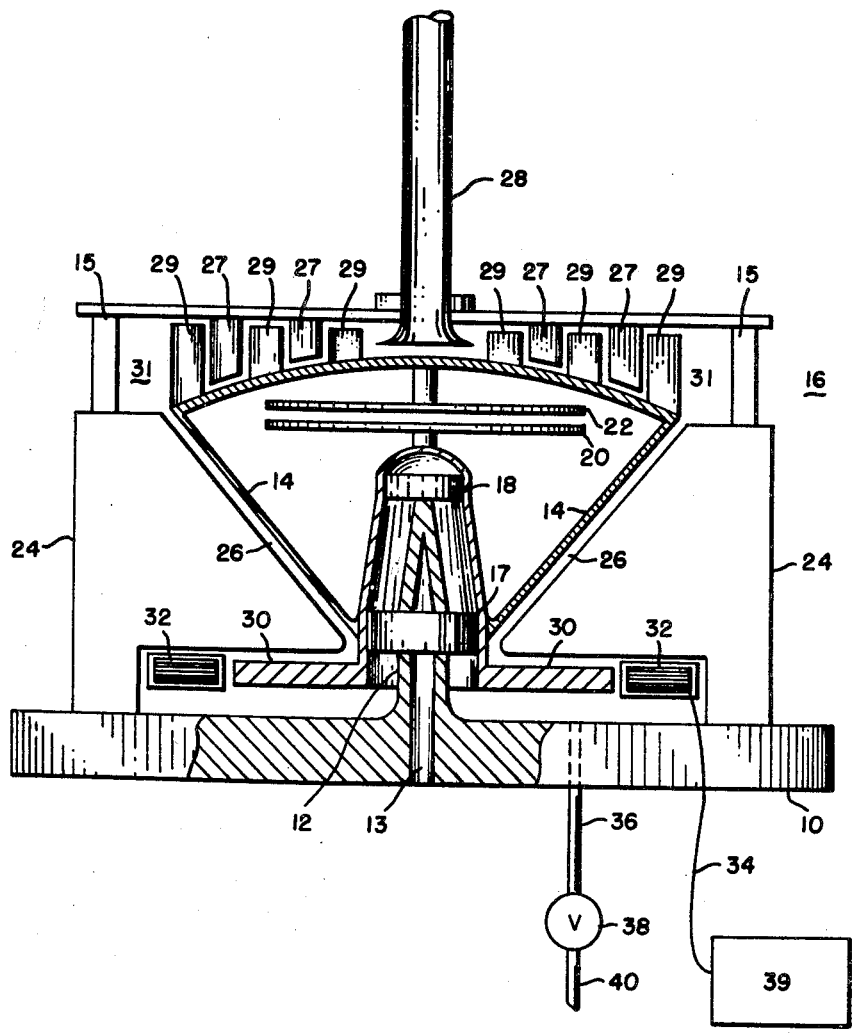
INVENTOR.
GEORGE A. ZOTOS
BY
ATTORNEY United States Patent Office 3,177,369
Patented Apr. 6, 1965

3,177,369
CRYOGENIC EXPANDER
George A. Zofos, Baltimore, Md., assignor to Martin-Marietta Corporation, a corporation of Maryland
Filed May 2, 1961, Ser. No. 107,148
20 Claims. (Cl. 290—52)

This invention relates to a device for expanding a compressed gas and more specifically it relates to a device utilizing a turbine for expanding a compressed gas cryogen.

Devices utilizing turbines in expanding compressed gas cryogens have heretofore taken a multitude of complex configurations resulting from efforts to provide support for a turbine wheel which operates within low temperature environments. Typical expander designs encountered must cope with the natural inabilities of bearings to perform at low temperatures in view of restricted lubricants available and the complex means required in the transmission of the work of rotative energy derived from the turbine to contiguous mechanisms at higher temperature ambient surroundings.

Generally, efforts have led to situating the turbine wheel upon a comparatively long supporting shaft which in turn may be supported at a considerable distance from the wheel by conventional bearings or mechanical means. Such long supporting shafts attempt to maintain the bearing support so remote as to isolate the cryogenic or cold geometry attendant with the low temperatures of the turbine wheel from the supporting geometry, as defined at the locale of the shaft and the bearings. Other efforts to provide for facile rotation of the turbine wheel have utilized a gaseous actuated bearing means wherein the shaft supporting the turbine wheel is suspended upon a gaseous layer thereby obviating the problems associated with bearing friction. Such gaseous bearing devices, while retaining the advantage of being operable in close proximity to the turbine wheel and its cryogenic surroundings or cold geometry, contain a myriad of inherent, undesirable characteristics.

The mechanical bearing methods for supporting the turbine wheel wherein the bearings are situated outside of the cold geometry of the expander have led to serious problems in shaft vibration caused by the necessarily long supporting structure between the bearings. The long supporting shafts have also generated torsional problems arising from the transmission of work imparted from the turbine wheel to exterior work absorbing means. Evidence of this problem is manifested in observing that the inertial momentum factor of a shaft is typically relatable to the fourth power of its diameter. Of course, efforts have been directed to eliminating these problems by moving the bearings closer to the turbine site. However, the problem of insulating the supporting shaft and bearings from the cold geometry has not been solved in complement thereto. Lubrication means for the bearings under the extreme cold conditions at the cold geometry have proved unsuccessful, especially in view of the necessarily high rotational speed required of modern expanders. These speeds may range from about 10,000 r.p.m. to 30,000 r.p.m. or more. In view of the inability to suitably lubricate bearings under the influence of the cold geometry, expanders utilizing mechanical bearing means suffer under the restrictions of a relatively short lifetime and in a low overall cold production efficiency. Modern design demands now require that expanding devices be of light weight and compact design. In view of the elaborate supporting shaft considerations and lubricating problems, designs to date have been found undesirable.

Expanders utilizing turbines having shafts supported by a gas introduced under pressure, while retaining the advantage of having bearing support within the cold geometry, have in turn suffered under the restriction that there remains a requirement for the continuous injection of the gas from the system compressor or other external means to actuate the bearing device. Obviously, the loss of work from the compressor obviates the advantages attendant with the close support at the cold geometry of the turbine wheel. Gas bearing means also must utilize extraneous gas compartments or gas chambers and the like in order to operate the bearing means. A further restriction attends from the nature of a gas support of the turbine shaft in that such bearings by their nature necessarily will require high clearances, which clearances must lead to equal or higher tolerances in the complementary parts of the overall device. Such complications have led to the turbine operation becoming inherently and aerodynamically unstable. Low reliability of the expander is then a consequence of such instability. Expanders using such bearing means also suffer from low efficiency and in view of extraneous supporting devices are difficult to design for compact requirements in modern diversified industrial applications.

This invention presents a cryogenic expander which is operable with cryogens in the helium range, which range will include temperatures to about 4° absolute. The device is operable with mechanical bearing means utilizing high precision bearings, thereby eliminating turbine instability problems of clearances and tolerance. The instant device will provide for the elimination of torsional work transfer problems from the turbine wheel to work transfer mechanisms and therefore offers an overall improvement in the dynamic properties of expanders. Through the elimination of the disadvantages attendant with conventional gas bearing and mechanical bearing turbine expanders, the expander as now presented may combine the advantages of the aforedescribed prior devices, while still being of compact design for modern requirements.

A further objective of the present invention is to provide a cryogenic expander for removing energy from a compressed gas, including a static spindle in combination with an insulated rotor means spaced intermediate a turbine and the spindle. The expander will allow for a close spacial relationship between the cold geometry and the bearing geometry of the device. The invention may also provide for the magnetic-electric transmission of work from a compactly encapsulated expander.

These and other objects, features and advantages will be apparent from the annexed specifications and drawings in which the single figure is a schematic representation of an expander according to the invention.

Referring now to the figure in detail, an expander for use within a cryogenic system is shown depicting a base member 10 supporting a stationary or static spindle 12. The spindle may have a hollow portion or cavity 13 communicating to the exterior of the expander. An insulative rotor 14 is supported rotatably upon spindle 12 by means of precision mechanical bearings as at 17 and 18. The rotor 14 supports and is joined to a turbine shown generally at 16, while being fashioned to maintain a very high or super-insulating relationship between spindle 12 and the turbine 16. Although a simple hollow and preferably evacuated body is depicted in the drawing, the rotor may assume various insulative configurations. Particularly, it may be evacuated, having double walls, thereby to assume Dewar characteristics. The rotor may also uniquely or additionally confine suitable insulating materials such as glass wool and the like, depending on the quality of insulation required under the temperature design requirements of the expander. To provide for further insulation of the bearings as at 17 and 18 from the cold geometry of the expander, heat deflecting radiation disks 20 and 22 are positioned within the rotor and intermediate the turbine. An envelope of super-insulating material 24 surrounds the side portion of rotor 14 and is spaced therefrom so as to define a gap 26. The insulating material 24 may be of any conventional type suitable for the temperatures to be utilized within the expander. Common among such insulations are packages of highly insulated sandwich structures comprising materials such as glass wool which, in addition, may have strongly insulating shieldings contained therein.

The turbine 16 comprises an upper portion or cap 15 arranged in suitable connection with insulating envelope 24 so as to encapsulate the upper portion of the expander device. The cap 15 may support an arrangement of stationary or reversing turbine buckets 27 which are operable in complement with the buckets 29 disposed upon the rotor 14. Although several stages are depicted in the schematic drawing, it is understood that any of a multitude of turbine arrangements may be utilized effectively with the device. In the instant schematic, the turbine is radially actuated from a gas input directed through input nozzle 28. Gas may be expelled from the turbine into further portions of the cryogenic system through conduit means shown only generally at exit 31.

The rotor 14 is also shown in connection with a plurality of magnetic derived power extraction magnets 30 which are connected to and rotate in complement with the rotor in close proximity to static inductors 32. Upon rotation of the rotor and magnets, and A.C. voltage is induced in the inductors by the movement of the inherent field of the magnets thereacross. The energy derived therefrom may be directed through suitable circuitry 34 to be dissipated in a load impedance shown generally at 39, thereby allowing for the absorption of the energy of the mechanical work produced initially by adiabatic expansion of compressed gases within the turbine.

The insulating envelope 24 in combination with the base member 10 is shown to enclose the above described magnetic power extraction means, thereby providing the complete encapsulation of the expander.

A gas conduit 36 extends through the base member 10 to communicate with gases as may be present within gap 26. A valve for controlling the pressure and flow of such gas is depicted at 38. The gaseous output of valve 38 is directed, through suitable conduit means shown only generally at 40, into the overall cryogenic system (not shown) and preferably is returned to a compressor of the aforesaid system.

In the operation of the expander, rotative actuation of turbine 16 is effected by the input of compressed gas through conduit 28, whereby this gas is radially directed to one or a plurality of turbine stages thereby gyring rotor 14. The compressed gas is thereby expanded, providing for the expulsion of cooled gas at exit 31. The above-described expansion is effected within turbine 16 and may be considered to exist within the cold geometry of the expander. In obvious advantage over expanders described by prior art, the warm geometry as defined at the locale of the spindle 12 and attendant bearings is situated in relatively close proximity to the cold geometry, thereby allowing an inherently stable rotative work transfer configuration.

From the turbine, a minute portion of the cool, expanded gas is directed into gap 26 while the major flow is directed from exit 31 into the general cryogenic system attendant with the expander. The cooled gas directed into gap 26 provides a particular advantage in that the small cold production lost is utilized in convectively scavenging the clearance between the cold and warm ends of the rotor in order to prevent heat from penetrating from the warm geometry of the expander to its cold geometry at the turbine.

The minor shortcoming of minutely reduced cold gas outflow resulting from the scavenging operation vanishes completely at the higher capacity operation for which the expander is intended. Valve 38 in combination with conduit means 36 serves to control gas flow through the gap, and while shown but generally, may assume any configuration as dictated by the particular expander requirements. Upon issuing from valve 38, the scavenging gases are re-directed by a suitable conduit to the compressor of the general system for purposes of gas conservation and the pre-cooling of the overall cooling cycle.

In view of the high-rotational speeds at which the rotor is operated, cavity 13 within spindle 12 may be utilized for the purpose of cooling bearings 17 and 18.

As above-described, magnets 30 in connection with rotor 14 provide a unique characteristic in that the rotor, while operating in close proximity to the cold geometry, in turn allows for the extraction of power by rotating a magnetic field thereby inducing currents in a convenient non-rotating armature depicted by static inductor 32. An alternating current is picked up by suitable circuitry 34 outside of the enclosed expander, thus carrying the expansion energy out of a fully sealed system. A load impedance 39 dissipates or utilizes such energy in any optional fashion.

Through the unique provisions as above-described, a cryogenic expander is furnished having a high reliability, long life and compact design. Although the invention has been described by making reference to a detailed schematic reference to a preferred embodiment, such detail is to be understood in an instructive rather than a restrictive sense, many variants being possible within the scope of the claims hereunto appended.

I claim:

1. A cryogenic expander comprising a spindle, a turbine longitudinally spaced from the end of said spindle and evacuated rotor means intermediate said turbine and an end of said spindle and in connection with said turbine, said rotor means enveloping and being rotatably mounted upon said spindle whereby said turbine may perform expanding functions by rotation about said spindle while thermally insulated and separated therefrom by said rotor means.

2. A cryogenic expander comprising a spindle, a turbine longitudinally spaced from the end of said spindle thermally, insulative rotor means rotatably mounted upon and over an end of said spindle for carrying said turbine in insulated relationship from said spindle, thermal insulating means encapsulating said spindle and said rotor means and bearing means associated with said spindle for rotatably supporting said rotor means, whereby said turbine may perform expanding functions by rotation about said spindle while thermally insulated and separated therefrom by said rotor means.

3. A cryogenic expander for removing energy from a compressed gas comprising a static spindle, a base member supporting one end of said spindle, a turbine for expanding said compressed gas longitudinally spaced from the other end of said spindle and rotatable about the projected longitudinal axis of said spindle, rotor means connected to and supporting said turbine, said rotor means rotatably mounted upon and substantially enveloping said spindle, and thermally insulating means in connection with said base member and surrounding said rotor means and being spaced therefrom so as to define a gap between said rotor means and said insulating means in communication with a portion of said gases expanded by the said turbine.

4. A device for expanding a compressed gas comprising a static spindle, a base member supporting said spindle, a turbine longitudinally spaced from the end of said spindle and rotatable about the projected longitudinal axis of said spindle, rotor means rotatably mounted upon said spindle for carrying said turbine in thermally insulated relationship from said spindle, thermal insulating means surrounding said rotor means and spaced therefrom so as to define a gap, said thermal insulating means being in connection with said base member, means for directing said compressed gas into said turbine, means for expelling expanded gas from said turbine and means for directing a portion of said expanded gas into said gap defined between said rotor means and said thermal insulating means.

5. A device for expanding a compressed gas comprising a spindle, a base member supporting said spindle, a turbine longitudinally spaced from the end of said spindle and rotatable about the projected longitudinal axis of said spindle, motor means rotatably mounted upon said spindle for carrying said turbine in thermally insulated relationship from said spindle, thermal insulating means in connection with said base member and surrounding said rotor means and spaced therefrom so as to define a gap, means for expelling expanded gas from said turbine, means for directing a portion of said expanded gas into said gap defined between said rotor means and said thermal insulating means, and valve means in communication with said portion of expanded gas for controlling the flow of said expanded gas through said gap.

6. A device for expanding a compressed gas comprising a spindle, a base member supporting said spindle, a turbine longitudinally spaced from the end of said spindle and rotatable about the projected longitudinal axis of said spindle, an evacuated rotor rotatably mounted upon said spindle for carrying said turbine in thermally insulated relationship from said spindle, bearing means intermediate said spindle and said rotor, thermal insulating means surrounding said rotor and spaced therefrom so as to define a gap, said thermal insulating means being in connection with said base member, means for directing said compressed gas into said turbine, means for expelling expanded gas from said turbine, means for directing a portion of said expanded gas into said gap defined between said rotor means and said thermal insulating means, and valve means for monitoring the flow of expanded gas through said gap.

7. A device for expanding a compressed gas comprising a static spindle, a base member supporting said spindle, a turbine longitudinally spaced from the end of said spindle and rotatable about the projected longitudinal axis of said spindle, an evacuated rotor rotatably mounted upon and substantially enveloping said spindle for carrying said turbine in thermally insulated relationship with said spindle, bearing means intermediate said spindle and said rotor, thermal insulating means surrounding said rotor and spaced therefrom so as to define a gap, said thermal insulating means being in connection with said base member, means for directing said compressed gas into said turbine, means for expelling expanded gas from said turbine, means for directing a portion of said expanded gas into said gap defined between said rotor means and said thermal insulating means, and valve means for monitoring the flow of expanded gas through said gap.

8. A device for expanding a compressed gas comprising a spindle, a base member supporting said spindle, a turbine longitudinally spaced from the end of said spindle and rotatable about the projected longitudinal axis of said spindle, an evacuated rotor rotatably mounted upon and substantially enveloping said spindle for carrying said turbine in thermally insulated relationship with said spindle, radiation reflecting means enclosed within said rotor and intermediate said spindle and said turbine, bearing means intermediate said spindle and said rotor, thermal insulating means surrounding said rotor and spaced therefrom so as to define a gap, said thermal insulating means being in connection with said base member, means for directing said compressed gas into said turbine, means for expelling expanded gas from said turbine, means for directing a portion of said expanded gas into said gap defined between said rotor means and said thermal insulating means, and valve means in communication with said gap for monitoring the flow of said expanded gas through said gap.

9. A device for expanding a compressed gas comprising a substantially hollow spindle, a base member supporting said spindle, a turbine longitudinally spaced from the end of said spindle and rotatable about the projected longitudinal axis of said spindle, an evacuated rotor rotatably mounted upon and substantially enveloping said spindle for carrying said turbine in thermally insulated relationship with said spindle, radiation reflecting means enclosed within said rotor and intermediate said spindle and said turbine, bearing means intermediate said spindle and said rotor, thermal insulating means surrounding said rotor and spaced therefrom so as to define a gap, said thermal insulating means being in connection with said base member, means for directing said compressed gas into said turbine, means for expelling expanded gas from said turbine, means for directing a portion of said expanded gas into said gap defined between said rotor means and said insulating means, and valve means in communication with said gap for monitoring the flow of said expanded gas through said gap.

10. A device for expanding a compressed cryogen comprising a substantially hollow spindle, a base member supporting said spindle, a turbine longitudinally spaced from the end of said spindle and rotatable about the projected longitudinal axis of said spindle, an evacuated rotor rotatably mounted upon and substantially enveloping said spindle for carrying said turbine in thermally insulated relationship with said spindle, radiation reflecting means enclosed within said rotor and intermediate said spindle and said turbine, bearing means intermediate said spindle and said rotor, thermal insulating means surrounding said rotor and spaced therefrom so as to define a gap, said thermal insulating means being in connection with said base member, means for directing said compressed gas into said turbine, means for expelling expanded gas from said turbine, means for directing a portion of said expanded gas into said gap defined between said rotor means and said thermal insulating means, valve means in communication with said gap for monitoring the flow of said expanded gas through said gap, magnetic means in connection with said rotor means for providing a movable magnetic field, and stationary conduction means within the path of said movable magnetic field, whereby a portion of the energy of said compressed gas is converted into electrical energy.

11. Means for extracting energy from a cryogenic fluid comprising: a support structure including an elongated spindle supported at one end by a base member and projecting therefrom; a thermally insulating envelope; a rotor member of thermally insulative construction rotatively mounted upon and surrounding the elongated spindle of said support structure and disposed within said insulating envelope; a turbine for receiving energy of rotation from a stream of cryogenic fluid fixed to said rotor member; and means spaced from said turbine adjacent the base of said spindle for transferring energy of rotation to an external environment.

12. A turbine expander for extracting thermal energy from a gas cryogen comprising: a rotary turbine member; means for directing a compressed gas cryogen toward said rotary turbine member to cause rotation thereof; means for expelling expanded gas cryogen from said turbine expander; means for supporting said rotary turbine member for rotation and for thermally insulating the turbine environment from its surroundings including a thermally insulating enclosure, a base member having a spindle projecting therefrom into the interior of said enclosure and, a thermally insulating rotor supported on and surrounding the projecting end of said spindle, said insulating rotor carrying upon a surface remote from said spindle the aforesaid rotary turbine member; and means adjacent the base of said spindle and driven by said insulating rotor for converting the kinetic energy of said rotor and rotary turbine member into another form of energy for dissipation in a remote environment.

13. Means for extracting energy from a cryogenic fluid comprising: a support structure; a thermally insulated envelope; means rotatably mounted upon said structure and within said insulated envelope, said rotatably mounted means including a turbine for receiving energy of rotation from a stream of cryogenic fluid and an evacuated carrying portion; work transfer means spaced from said turbine for transferring energy of rotation to an external environment; and means for directing a portion of the cryogenic fluid from said turbine through said envelope into the area between said turbine and said support structure to minimize the transfer of thermal energy from said support structure into said turbine.

14. Means for extracting energy from a cryogenic fluid comprising: a support structure; a thermally insulated envelope; means rotatably mounted upon said support structure within said insulated envelope, said rotatably mounted means including a turbine for receiving energy of rotation from a stream of cryogenic fluid, and a thermally insulation filled turbine carrying portion; work transfer means spaced from said turbine for transferring energy of rotation to an external environment; and means for directing a portion of the cryogenic fluid from said turbine through said envelope into the area between said turbine and said support structure to minimize the transfer of thermal energy from said support structure into said turbine.

15. Means for extracting energy from a cryogenic fluid comprising: a support structure; a thermally insulated envelope; means rotatably mounted upon said support structure and within said insulated envelope, said rotatably mounted means including a turbine for receiving energy of rotation from a stream of cryogenic fluid; work transfer means spaced from said turbine for transferring energy of rotation to an external environment; and means for directing a portion of the cryogenic fluid from said turbine through said envelope into the area between said turbine and said work transfer means to minimize the transfer of thermal energy from said work transfer means into said turbine.

16. A device for expanding a compressed gas to extract energy therefrom comprising: a static support structure, including an elongated member supported at one end by a base member and projecting therefrom; a rotary turbine; thermally insulating rotor means rotatably mounted upon and surrounding the elongated member of said support structure for carrying said turbine in thermally insulated relationship from said support structure; a thermally insulating envelope surrounding said rotor means and spaced therefrom to define a gap; means for directing compressed gas into said turbine; means for expelling expanded gas from said turbine; and means for directing a portion of the expanded gas from said turbine through the gap between said enclosure and said rotor means to minimize the transfer of thermal energy from said support structure into said turbine.

17. A device for expanding a compressed gas to extract energy therefrom comprising: a static support structure, including an elongated member supported at one end by a base member and projecting therefrom; a rotary turbine; thermally insulating rotor means rotatably mounted upon and surrounding the elongated member of said support structure for carrying said turbine in thermally insulated relationship from said support structure; bearing means intermediate said elongated member and said rotor means; a thermally insulating enclosure surrounding said rotor means and spaced therefrom to define a gap; means for directing compressed gas into said turbine, means for expelling expanded gas from said turbine; work transfer means driven by said rotor means and located at the opposite end of said gap from said turbine for transferring energy of rotation to an external environment; and means for directing a portion of the expanded gas from said turbine through the gap between said enclosure and said rotor means and toward said work transfer means and said bearing means to minimize the transfer of thermal energy from said work transfer means and bearing means into said turbine.

18. A cryogenic expander comprising a spindle, a turbine longitudinally spaced from the end of said spindle and thermally insulative rotor means intermediate said turbine and an end of said spindle, said rotor means being connected to said turbine and substantially enveloping and rotatably mounted upon said spindle, whereby said turbine may perform expanding functions by rotation about said spindle while thermally insulated and separated therefrom by said rotor means.

19. A cryogenic expander for removing energy from a compressed gas comprising a spindle; a base member supporting said spindle; a turbine for receiving and expanding said compressed gas longitudinally spaced from the end of said spindle and rotatable about the projected axis of said spindle; rotor means including a chamber substantially filled with thermal insulation rotatably mounted upon said spindle for carrying said turbine in thermally insulated relationship from said spindle; magnetic means in connection with said rotor means for providing a movable magnetic field; and stationary conduction means in the path of said movable magnetic field whereby a portion of the energy of said compressed gas is converted into electrical energy.

20. A cryogenic expander for removing energy from a compressed gas comprising a spindle; a base member supporting said spindle; a turbine for receiving and expanding said compressed gas longitudinally spaced from the end of said spindle and rotatable about the projected axis of said spindle; rotor means including a chamber substantially filled with thermal insulation rotatably mounted upon said spindle for carrying said turbine in thermally insulated relationship from said spindle; at least one magnet in connection with said rotor means to provide a movable magnetic field; and stationary conduction means within the path of said movable magnetic field and in connection with said base member, whereby a portion of the energy of said compressed gas is converted into electrical energy.

References Cited by the Examiner

UNITED STATES PATENTS

| | | | |
|---|---|---|---|
| 1,363,087 | 12/20 | Clayton | 310—157 |
| 2,064,070 | 12/36 | Mapes | 310—157 |
| 2,495,745 | 1/50 | Litton | 290—52 |
| 2,783,392 | 2/57 | Corbiere | 290—52 |
| 2,787,715 | 4/57 | Danel | 310—52 |
| 2,917,637 | 12/59 | Akeley | 290—52 |
| 3,024,366 | 3/62 | Yanagimachi | 290—52 |

FOREIGN PATENTS 945,183    7/56    Germany.

ORIS L. RADER, *Primary Examiner.*

MILTON O. HIRSHFIELD, *Examiner.*